United States Patent Office 3,138,896
Patented June 30, 1964

3,138,896
METHOD OF CONDITIONING SOIL BY APPLYING PETROLEUM FRACTIONS
Allen F. Millikan, Crystal Lake, Ill., assignor to The Pure Oil Company, Chicago, Ill., a corporation of Ohio
No Drawing. Filed June 1, 1961, Ser. No. 125,890
6 Claims. (Cl. 47—58)

This invention relates to a methodd of treating soil, and more particularly to a method of conditioning soil to enhance plant growth, control weeds in the soil for certain vegetables and flowers, and to inhibit pathogenic organisms, including certain fungi, insects, nematodes, and bacteria detrimental to plant growth.

Petroleum fractions and products have been used as ingredients in herbicides, insecticides, weed killers, and the like, where the compositions are applied as sprays to plant foliage. Specific pure hydrocarbons such as benzene and naphthalene have been mentioned in the literature as agents for controlling mildews, and diphenyl has been used as a fungicide for fruit wraps. The control of septoria leafspot and other fungus-caused plant diseases, nematodes, and other pathogens in the soil, among many other agricultural problems, is the subject matter of great volumes of literature, but the literature is devoid of references to the general utility of petroleum for these purposes. Perhaps a reason for this hiatus in the art is the long-recognized fact that hydrocarbon mixtures are known non-specific herbicides and are difficult to control. Hydrocarbon mixtures used as carriers for pest toxicants in agricultural sprays are generally free from aromatic and naphthenic hydrocarbons because of the herbicidal effects of these hydrocarbons. Predominantly paraffinic hydrocarbons appear as the most desirable for use as carriers for toxicants for sprays to be used on gardens, orchards, and wood lots. Pure paraffins and isoparaffins present in alkylates are used as toxicants for mealy bugs, or applied to the foliage or roots of tomato plants, without harm to the plants in accordance with U.S. Patent 2,502,366 by W. A. Beman et al. Hydrocarbons having a boiling range which includes gasoline, and extends up to 700° F. or higher, when destructively hydrogenated form good herbicidal oils for the control of perennial weeds according to Warner et al., Patent 2,160,929. "Edeleanu-extract" is useful as an insecticide in accordance with de Ong Patent 1,917,754.

Because of the non-selective herbicidal qualities or general phytotoxicity of petroleum oils, their permanent soil-sterilization qualities, and the general unpredictability of their effect on plant growth, little is published relative to the art of soil treatment with petroleum fractions as related to the problems of the control of nematode and fungus attack on plants susceptible thereto, the control of weeds in gardens, fields, greenhouses, hot beds, and outdoor flower beds for seedling plants, bulbs, corms, rhizomes, tubers, deep-planted types of flowers, and vegetables, or the control of insects and other pathogenic organisms in soil. Basically, the reason for this is perhaps that certain petroleum hydrocarbons are often strongly herbicidal and are believed to have practically permanent soil sterilization qualities; thus their use is considered to be beset with the hazard that the soil so treated may become useless as a growing medium for plants.

In accordance with this invention, a process has been discovered whereby petroleum fractions, including the entire crude oil from kerosines to residua, can be used to enhance plant growth, and control weeds, nematodes and fungi, without the danger of permanent damage to the soil.

In one aspect of my invention I have discovered that soil can be conditioned prior to planting by applying thereto a fuel oil fraction boiling in the range of about 450° to 700° F. In this treatment, about 100 to 5000 gallons per acre are applied. It was found that by this method fungus and nematode attack on chrysanthemums was inhibited, and the growth of the plant was enhanced.

Another aspect of this invention lies in the discovery that treating soil with a petroleum fraction boiling in the range of about 300 to 1000° F. several days or weeks prior to transplanting healthy plants into the plot results in effective control of weeds, and the growing plants are not damaged when this soil treatment is carried out one week to a month prior to planting.

Still another feature of this invention comprises the discovery that by treating soil with a non-volatile petroleum fraction, at least about 50% of which boils have 400° F. and which contains up to about 50% of aromatics, the need for cultivation is minimized or eliminated, weed growth is greatly inhibited, and plant growth is enhanced. This aspect of the invention relates particularly to deep-planted bulbs, tubers, and corms.

In still another embodiment of the invention, soil to be used for horticultural purposes is treated at times critically related to the growing season with critical doses of petroleum fractions having boiling ranges within the temperature range from about 300° F. to the end boiling point of crude oil.

Accordingly, it becomes a primary object of this invention to provide a method of conditioning soil to enhance plant growth, control nematodes and fungi, minimize cultivation, increase moisture retention, control weed growth, and control insects and bacteria.

The invention is illustrated by the following examples:

EXAMPLE I

The method of this invention was discovered accidentally when a No. 1 fuel oil was spilled on a chrysanthemum bed while filling a tank during early June, 1958, and again during the summer of 1959. A few weeks after the second occurence, some small chrysanthemum plants were planted in the soil which had been contacted by the fuel oil. After 2–3 weeks, it was observed that their growth was notably more vigorous than the growth of plants in other, nearby locations. At this time, the plants were transplanted to another location, and were watered heavily (conducive to the stimulation of fungus growth and spread), whereupon four plants of particular vigor lost their healthy appearance, drooped, and died in about 2 weeks.

The pathological symptoms of the dying plants corresponded to infection by one or both of the water molds, Pythium and Phytophthora. It is believed that the oil treatment sterilized the first soil medium of these pathogens while the second soil bed harbored the pests which subsequently killed the plants. The unusual vigor in the first bed was brought about by freedom from attack by these pathogens, and also by the enrichment of soil nitrogen resulting from the death of these and other soil organisms.

EXAMPLE II

A four-foot by four-foot area on the south side of a brick building in the Crystal Lake area was spaded on May 31, 1960, and was treated with one gallon of a mixture consisting of 25% v. of No. 6 fuel oil and 75% v. of No. 2 furnace oil applied with a sprinkling can, a dosage equivalent to about 2,700 gallons per acre. The ground was fertilized at a rate of approximately 1,000 pounds per acre with a 5–5–0 (5% nitrogen; 5% phosphoric oxide, $P_2O_5$; 0% potash, $K_2O$) organic fertilizer. On June 13, 1960, three "Winterset" chrysanthemum plants were planted in a line 15 inches from the wall and 13 inches from either side boundary of the plot. At the same time, three "Coppersmith" chrysanthemum plants were planted in a line 15 inches from the front boundary and 13 inches from either side boundary of the plot. A four-foot by four-foot control plot with identical fertilizing, but with no oil treatment, was planted with chrysanthemums at the same time in an identical manner. Except on rainy days, the plants in both plots were soaked daily throughout the growing season with approximately one inch of water.

On July 6, 1960, it was observed that the plot which had been treated with oil about two weeks prior to planting was substantially free of weeds, while the untreated control plot was heavily infested with weeds. The chrysanthemum plants in both plots were healthy. In mid-July, 10–10–10 fertilizer was applied to both plots at a rate of about 600 pounds per acre. Weed control in the treated plot was still 100% effective about 12 weeks after planting.

EXAMPLE III

In a companion experiment to Example II, one area of prepared soil was treated with a mixture consisting of 50% v. of No. 6 fuel oil and 50% v. of No. 2 fuel oil at a dosage equivalent to about 2,700 gallons per acre, and another adjacent area was treated at a dosage equivalent to about 5,400 gallons per acre. Immediately after the areas had been treated, divisions of wintered-over chrysanthemums were transplanted into them. Weed control was effective in both areas but the plants did not thrive and some died, damage to the plants being more pronounced in the more heavily treated area. This experiment showed that there should be a time interval of several days between the oil treatment of the soil and planting.

EXAMPLE IV

An experiment duplicating Example II, except that No. 1 fuel oil was used, was run in a plot alongside the plot used in Example II. The oil dosage, fertilizing, planting, watering, observing, etc., were the same. Weed control was complete on July 6 and one month later (eight weeks after planting), but had diminished to an appreciable extent at the end of 12 weeks after planting, apparently because the relatively light fuel oil had weathered from the soil.

EXAMPLE V

In a companion experiment to Example IV, one area of prepared soil was treated with No. 1 fuel oil at a dosage equivalent to 2,700 gallons per acre, and an adjacent area was treated at a dosage equivalent to about 5,400 gallons per acre. Immediately after the treatment, divisions of wintered-over clumps of chrysanthemums were planted in the area. Weed control was effective, but the plants did not thrive and some died, damage to the plants being more pronounced in the more heavily treated area. This experiment confirmed the conclusion reached in Example III that several days or weeks should elapse after treating the soil before placing plants in it.

EXAMPLE VI

A one-quart Mason jar was filled with light, sandy loam soil in good seed-bed condition from the standpoint of tilth and moisture. Eight ml. of #1 fuel oil was added to the jar which was then sealed. This treatment inhibited all nematodes in the soil except certain saprophagous species which are not plant pests, but live on decaying organic matter. The inactivity accompanying the inhibition assures that plant damage and nematode reproduction are minimized.

EXAMPLE VII

The procedure of Example VI was followed except that 8 ml. of #2 fuel oil was used instead of #1 fuel oil. Again, the activity of all nematodes except saprophagous species was inhibited, thus minimizing plant damage and nematode reproduction.

EXAMPLE VIII

A plot of ground is plowed and otherwise prepared in the conventional fashion for planting gladiolus corms, the corms are planted according to usual practice, and the plot is watered thoroughly. One week later, the surface of the plot is cultivated lightly to free it of weed seedlings, and one-half of the plot is treated in accordance with this invention by spraying it with No. 2 fuel oil at a dosage equivalent to 2,500 gallons per acre. The other half of the plot is left untreated for comparison.

Gladiolus plants appear above the surface at the same time in both sections of the plot, but as the plants develop, the treated section remains free of weeds, while the control section becomes heavily infested. As the gladiolus plants continue to grow, the vigor of the plants in the weed-infested control section becomes noticeably poorer than the vigor of the plants in the treated section. Ultimately, the blossoms on the plants in the treated section are far superior to the blossoms on the plants in the control section, the crop of corms harvested from the treated section is greater than from the untreated section, and the size and quality of the corms from the treated section are superior to the size and quality of the corms from the untreated section.

EXAMPLE IX

Each of two greenhouse benches, measuring 3 ft. x 6 ft. x 6 in., is filled with ⅓ cubic yard of soil. Then the soil in the benches is infected with cultures of *Agrobacterium tumefaciens*, the bacterium causing crown gall. The infected soil is kept moist for a two-week period, after which time the soil in the No. 1 bench is treated with ½ gallon of No. 1 furnace oil, applied with a sprinkling can. After two more weeks with regular watering, the bacterial populations of the two benches are compared. It is found that the infecting bacteria are drastically reduced in the soil in the No. 1 bench, but continue to increase in the No. 2 bench.

EXAMPLE X

A five-acre field of squash is severely infested and adversely affected by squash borer. It is plowed in October and the following April is treated with No. 1 furnace oil at a dosage of 100 gallons per acre, the furnace oil being applied by means of a mechanical sprayer. About one month later it is planted with acorn squash, and the squash vines are found to be completely free of borers during the entire growing season. An excellent crop of squash is obtained. This healthy growth is directly attributable to destruction of the mature larvae and pupae which wintered over in the soil.

EXAMPLE XI

In order to further demonstrate the invention, another series of experiments was conducted to compare the weed control, fungus control, nematode control, and phytotoxicity of fuel oils, their mixtures, a paraffinic hydrocarbon, and known proprietary compositions on the growth of two different chrysanthemum clones, one highly susceptible to fungus infection and the other not as susceptible. The susceptible clone is known as Coppersmith and the other is named Winterset.

A four-foot by twenty-four-foot area along the south wall of a building in the Crystal Lake, Illinois, area was spaded, divided into six plots measuring 4' x 4', and treated with quantities of fuel oils and aromatic-free alkylate approximating the cost of the recommended dosages of the proprietary compositions designated Compositions A and B. The kind and amount of treatment of the plots is shown in Table I.

*Table I*

TREATMENT OF PLOTS PLANTED WITH CHRYSANTHEMUMS

| Plot No. | Agent | Dosage |
|---|---|---|
| 1 | {74 vol. percent #2 Fuel Oil <br> {25 vol. percent #6 Fuel Oil | 1 gal./16 sq. ft.; approx. 2700 gals. per acre. |
| 2 | #1 Fuel Oil | Do. |
| 3 | Alkylate | Do. |
| 4 | None (control) | |
| 5 | Composition A | ⅙ qt./16 sq. ft.; approx. 110 gals. per acre. |
| 6 | Composition B | 10 grams/16 sq. ft.; approx. 58 lbs. per acre. |

The plots were treated on May 31, 1960 and planted 13 days thereafter, namely, on June 13, 1960, with the Coppersmith variety in the foreground and the Winterset variety in the background. Fungus and foliar nematode infection was encouraged by (1) daily sprinkling with ample water on rainless days, and (2) watering in the late afternoon so that the plant foliage could not dry before nightfall. On July 6, 1960, September 1, 1960, and October 19, 1960, the plots were observed carefully for weed control, fungus control, and phytotoxicity, giving ratings of excellent, good, little, or none to weed control and fungus control. No phytotoxicity was observed throughout the experiments. The results are shown in Table II.

*Table II*

| Plot No. | 7-6-60 | | 9-1-60 | | 10-19-60 | |
|---|---|---|---|---|---|---|
| | Weed Control | Fungus and Nematode Control | Weed Control | Fungus and Nematode Control | Weed Control | Fungus and Nematode Control |
| 1 | Exc | No Infection noted. | Exc | Good | Exc | Good. |
| 2 | Exc | do | Good | Exc | Good | Exc. |
| 3 | None | do | None | Little | None | Little or none. |
| 4 | do | do | do | None | do | None. |
| 5 | Exc | do | do | Good | do | Little. |
| 6 | None | do | do | None | do | None. |

On September 13, 1960, 42 white icicle radish seeds were planted in the border foreground of each of plots 1, 2, 3, and 4. On September 21, 1960, the percent germination of seeds was observed as an indication of the soil-sterilization properties of the furnace oils and alkylate with the following results:

*Table III*

SOIL-STERILIZATION MEASUREMENT

| Plot No. | Soil Treatment | Percent Germination |
|---|---|---|
| 1 | {75 Vol. Percent #2 Fuel oil <br> {25 Vol. Percent #6 Fuel oil | 100 |
| 2 | #1 Furnace oil | 88 |
| 3 | Alkylate | 93 |
| 4 | None (control) | 90 |

On October 25, 1960, the radishes were pulled and examined. They were uniformly free of fungus infection and those in plots No. 1 and No. 2 were, on the average, slightly smaller than those from plots Nos. 3 and 4. Also, on this date a final evaluation of the plots was made using a five-point rating of excellent, good, fair, poor and very poor as to the plant vigor of the two varieties of chrysanthemums, from the consensus of independent evaluations of two observers, with the following results:

*Table IV*

FINAL EVALUATION OF PLOTS FOR PLANT VIGOR

| Plot | Treatment | Coppersmith (front) | Winterset (back) |
|---|---|---|---|
| 1 | {75 Vol. Percent #2 Fuel oil <br> {25 Vol. Percent #6 Fuel oil | 3-fair | 3-good. |
| 2 | #1 Fuel oil | {2-excellent <br> {1-good | } Do. |
| 3 | Alkylate | 3-poor | Do. |
| 4 | (Control) | {2-poor <br> {1-very poor | 2-fair. <br> 1-very poor. |
| 5 | Composition A | 3-fair | 3-poor. |
| 6 | Composition B | {1-fair <br> {2-very poor | 1-excellent. <br> 2-very poor. |

Several observations may be made concerning the foregoing results. There was little fungus and nematode infestation until late August of the growing season, and by this time it became apparent that the Winterset clone was considerably more resistant to these infections than the Coppersmith clone. Consequently, the conclusions on fungus and nematode control herein are based primarily on the Coppersmith plants. From the time these infestations became pronounced in the plants, it was apparent that the oil-treated plots numbers 1 and 2 were equal or superior to the best of the chemically treated plots, namely, number 5, in fungus and nematode control. Plots 1 and 2 were also superior to the alkylate-treated plot number 3, the control-plot number 4, and the remaining chemically-treated plot number 6. Plot number 2, treated with number 1 fuel oil, was superior to all other plots with respect to fungus and nematode control. The observations regarding the relative vigor of the plants partially reflects the debilitating effect of different degrees of fungus and nematode infection.

The particular fungus organism or organisms which were present in the soil chosen for the experiments have not been fully identified, but the appearance of the leaves, the manner of attack and the conditions under which the fungus grows all point to the presence of one or both of the two pathogens causing chrysanthemum septoria leaf spot, *Septoria obesa* and *S. chrysanthemella*. Other fungus, infections that plague chrysanthemums include a powdery mildew (*Erysiphe cichoracearum*), a rust (*Puccinia chrysanthemi*), and a wilt (*Verticillium alboatrum*).

Diseased leaves from the plants on the test plots were collected, and then were examined by a competent nematologist who found that they were infected with *Aphelenchoides ritzema-bosi*, the chrysanthemum foliar nematode, i.e., the fungus attack was accompanied by foliar nematode attack. Thus it is apparent that the oil treatments control foliar nematodes as well as fungus infection.

The presence or absence of phytotoxicity resulting from the oil treatment is an important consideration since it is well known that most petroleum products are somewhat herbicidal when applied to plant foliage, and that aromatics are the most phytotoxic hydrocarbons and paraffins the least phytotoxic. The results of these experiments show that the plants in plots 1 and 2 were as healthy as the others in early observations, and healthier than the others in late observations, which indicates no detectable phytotoxic effect from the fuel oils. This is also reflected in the evaluations relative to plant vigor shown in Table IV.

A particular feature of the process of this invention is the discovery of the high degree of weed control that is available through the oil treatment. The results show that weed control was effective throughout the growing season in plot number 1 and was slightly less effective in plot number 2. The only other weed control detected was that from the commercial Composition A in plot number 5, but this fell off rapidly toward the end of the growing season.

The effectiveness of the weed control in the oil-treated plots raises the question of the ability of any plants to grow from seeds in these plots. The side-experiment with the radish seeds, showing at least 88% germination in 8 days growing time in mid-September, establishes that the fuel oils do not sterilize the soil to the extent of preventing seed germination.

EXAMPLE XII

In another series of experiments, a variety of divisions of wintered-over chrysanthemums were used as test plants, and were treated with, respectively, one gallon/16 square feet (approximately 2700 gallons per acre) of 50 volume percent number 2 fuel oil mixed with 50 volume percent number 6 fuel oil in the first plot; one gallon per 8 square feet (approximately 5400 gallons per acre) of the same mixture in a second plot; one gallon per 16 square feet (approximately 2700 gallons per acre) of number 1 fuel oil in a third plot and one gallon per 8 square feet (approximately 5400 gallons per acre) in a fourth plot. On the same day as the treatment, the wintered-over chrysanthemums were planted in the soil. A control plot was also maintained. Twenty-eight days later the plots were observed for weed control, fungus control, and nematode control using a rating of excellent, good, little, or none, and also rated for phytotoxicity when it appeared to be present, using a rating of much or very much. All four oil-treated plots showed excellent weed control, and the control plot was highly infested with weeds. There was no evidence of wide-spread fungus or nematode infection in any of the plots. The first and third plots showed much phytotoxicity, and the second and fourth plots showed very much phytotoxicity. About three months and 16 days later, the same observations were made regarding weed control, fungus control, nematode control, and phytotoxicity with the exception that the phytotoxic effects of the fuel-oil treatment appeared to overshadow any evidence of fungus or nematode infection. These results show that as far as phytotoxicity is concerned, an interval of at least 1 week or 2 weeks must be maintained between the time of treatment and the time of planting.

The following table gives the physical characteristics of the hydrocarbon oils used in these experiments along with the characteristics of additional oils that can be used in accordance with this invention.

In Table V the No. 3 Industrial Distillate has an A.S.T.M. color of 1. The thermal cracker bottoms may be any of the highly aromatic, low-API-gravity, fluid residua obtained by the distillation of thermally cracked, heavy, virgin gas-oils, and/or gas-oils produced by previous cracking of heavier virgin stocks. The thermal cracker bottoms shown in Table V has a C.O.C. flash point of 280° F., C.O.C. fire point of 400° F., acid number of less than 0.5, a Saybolt Furol viscosity at 122° F. of about 37.9 and at 210° F. of about 11.3, a pour point of +20, a trace of B.S. & W., displays a percent ash as oxide of less than 0.003 and has a Conradsen Carbon Residue of about 12.3%.

From the foregoing experiments it is apparent that this invention does not relate merely to applying the hydrocarbon oil to the soil and thereafter cultivating the soil and planting seeds, bulbs, or seedlings therein. Rather, the soil is first cultivated by various means known to the art, then treated with the hydrocarbon oil, allowed to lie dormant for a period of about 1 to 3 weeks and then planted, with or without further complete or partial cultivation, or preparation, such as digging holes for seeds, bulbs or seedlings, preparing trenches, or fertilizing and mulching. This procedure brings about the unexpected soil conditioning that expresses the invention.

The embodiments of the invention in which an exclusive property or privilege is claimed are defined as follows:

1. The method of conditioning soil, preventing the growth of weeds and the attack of susceptible plants by foliar nematodes, soil nematodes and fungus organisms which consists in cultivating the soil, applying about 100 to 5000 gallons per acre of fuel oil boiling in the range of about 450° to 700° F. to the cultivated soil and allowing said treated soil to lie dormant for a period of about one to three weeks prior to planting.

2. The method of promoting the growth of chrysanthemums and protecting same against attack by foliar nematodes, soil nematodes, and fungus organisms which consists in cultivating the soil, applying about 2700 gallons per acre of fuel oil boiling in the range of about 450° to 700° F. to the cultivated soil and allowing said treated soil to lie dormant for a period of about one to three weeks prior to planting said chrysanthemums.

3. The method of promoting the growth of chrysanthemums and protecting same against attack by foliar nema-

*Table V*

OIL TREATING AGENTS

| Oil | Tests | | | | | | | | | |
|---|---|---|---|---|---|---|---|---|---|---|
| | API Gravity | Distillation | | | | | | | | |
| | | IBP | 10% | 20% | 50% | 90% | 95% | EP | Percent Rec. | Percent Res. |
| #1 Fuel Oil | 41.0 | 334 | 380 | 394 | 435 | 510 | 534 | 560 | 99.0 | 1.0 |
| #2 Fuel Oil | 37.5 | 390 | 468 | 486 | 522 | 572 | 590 | 622 | 99.0 | 1.0 |
| #6 Residual Fuel Oil | 8.2 | | | | | | | | | |
| Range Oil | 41.3 | 332 | 374 | 389 | 437 | 516 | 532 | 557 | 99.0 | 1.0 |
| Kerosine | 43.3 | 330 | 368 | 380 | 412 | 468 | 482 | 512 | 99.0 | 1.0 |
| #3 Industrial Distillate | 26.6 | 420 | 473 | 490 | 530 | 602 | 618 | 646 | 98.7 | 1.3 |
| #5 Residual Fuel Oil | 10.1 | | | | | | | | | |

| Oil | Tests | | | | | | | | | | |
|---|---|---|---|---|---|---|---|---|---|---|---|
| | Saybolt Color | Doctor | Corrosion | Cetane No. | T.C.C. Flash | P.M. Flash | Percent Sed. | Pour Pt. | Percent B.S. & W. | Percent Sulfur | Percent Aromatic Hydrocarbons |
| #1 Fuel Oil | +21 | Neg. | 1A | 46.5 | 129 | | | | | | 15-25 |
| #2 Fuel Oil | +16 | | 1A | 54.5 | | | | | | | 15-25 |
| #6 Residual Fuel Oil | | | | | | 182 | | | | | |
| | | | | | | 210 | 0.05 | +35 | 0.15 | 1.34 | >20 |
| Range Oil | 21 | Neg. | 1A | | 126 | | | | | | |
| Kerosine | 28 | Neg. | 1A | | 126 | | | | | | |
| #3 Industrial Distillate | | | 1A | | | 214 | | | | | |
| #5 Residual Fuel Oil | | | | | | 220 | | +20 | 0.2 | 0.56 | |
| Thermal Cracker Bottoms | | | | | | | | +20 | Trace | 3.96 | | todes and fungus organisms which consists in cultivating the soil, applying about 2700 gallons per acre of No. 1 fuel oil having an initial boiling point of about 334° F. and an end point of about 560° F. and a gravity of about 41° A.P.I. and allowing said treated soil to lie dormant for a period of about one to three weeks prior to planting said chrysanthemums.

4. The method of promoting the growth of chrysanthemums and protecting same against attack by foliar nematodes and fungus organisms which consists in cultivating the soil, applying about 2700 gallons per acre of a mixture comprising about 75 volume percent of No. 2 fuel oil having an initial boiling point of about 390° F., an end point of about 622° F. and a gravity of about 37.5° A.P.I., and about 25 volume percent of No. 6 residual fuel oil having a gravity of about 8.2° A.P.I. and a P.M. flash of about 210° F. and allowing said treated soil to lie dormant for a period of about one to three weeks prior to planting said chrysanthemums.

5. The method of conditioning soil, preventing the growth of weeds and the attack of susceptible plants by foliar nematodes, soil nematodes and fungus organisms which consists in cultivating the soil, applying about 100 to 5000 gallons per acre of No. 1 fuel oil, boiling in the range of about 334° F. to about 560° F., to the cultivated soil and allowing the cultivated soil to lie dormant for a period of about one to three weeks prior to planting.

6. The method of conditioning soil, preventing the growth of weeds and the attack of susceptible plants to foliar nematodes, soil nematodes and fungus organisms which consists in cultivating the soil, applying about 100 to 5000 gallons per acre of a mixture comprising about 75 volume percent of No. 2 fuel oil having an initial boiling point of about 390° F., an end point of about 622° F. and a gravity of about 37.5° A.P.I., and about 25 volume percent of No. 6 residual fuel oil having a gravity of about 8.2° A.P.I. and a P.M. flash of about 210° F. and allowing said treated soil to lie dormant for a period of about one to three weeks prior to planting.

References Cited in the file of this patent

UNITED STATES PATENTS

| | | |
|---|---|---|
| 2,160,929 | Warner et al. | June 6, 1939 |
| 2,600,045 | Blondeau et al. | June 10, 1952 |
| 2,875,118 | Turner | Feb. 24, 1959 |
| 2,918,363 | Turner | Dec. 22, 1959 |
| 3,049,472 | Swezey | Aug. 14, 1962 |

FOREIGN PATENTS

| | | |
|---|---|---|
| 520,556 | Canada | Jan. 10, 1956 |

OTHER REFERENCES

Helgeson: "Methods of Weed Control," FAO Agricultural Studies, FAO 1957, pages 32 to 34.

Overbeek et al.: "Weeds," vol. III, Jan. 1954, No. 1, pages 55–65.

Bell et al.: "Agricultural Chemicals," Apr. 1950, pages 31–34, 99 and 101.

Crafts et al.: "Calif. Dept. Agri. Bulletin," vol. 35, No. 1, Jan.-Mar. 1946, pages 49–54.

UNITED STATES PATENT OFFICE
CERTIFICATE OF CORRECTION

Patent No. 3,138,896                       June 30, 1964

Allen F. Millikan

It is hereby certified that error appears in the above numbered patent requiring correction and that the said Letters Patent should read as corrected below.

Column 1, line 9, for "methodd" read -- method --; column 2, line 21, for "have" read -- above --; column 5, Table I, under the heading "Agent" line 1 thereof, for "74 vol. percent #2 Fuel Oil" read -- 75 vol. percent #2 Fuel Oil --; same Table I, under the heading "Agent" line 3 thereof, for "# Fuel Oil" read -- #1 Fuel Oil --; column 6, line 43, after "fungus" strike out the comma.

Signed and sealed this 17th day of November 1964.

(SEAL)
Attest:

ERNEST W. SWIDER
Attesting Officer

EDWARD J. BRENNER
Commissioner of Patents